United States Patent
Steinbruck

(10) Patent No.: US 7,845,686 B2
(45) Date of Patent: Dec. 7, 2010

(54) RESTRAINED PIPE JOINING SYSTEM FOR PLASTIC PIPE

(75) Inventor: Keith Steinbruck, Eugene, OR (US)

(73) Assignee: S & B Technical Products, Inc., Fort Worth, TX (US)

( * ) Notice: Subject to any disclaimer, the term of this patent is extended or adjusted under 35 U.S.C. 154(b) by 120 days.

(21) Appl. No.: 11/957,824

(22) Filed: Dec. 17, 2007

(65) Prior Publication Data

US 2009/0152863 A1    Jun. 18, 2009

(51) Int. Cl.
*F16L 39/00*    (2006.01)

(52) U.S. Cl. .................. 285/321; 285/305; 285/379

(58) Field of Classification Search .............. 285/91, 285/110, 111, 113, 232, 319, 321, 330, 339, 285/344, 349, 374, 375, 379
See application file for complete search history.

(56) References Cited

U.S. PATENT DOCUMENTS

| | | | | |
|---|---|---|---|---|
| 4,602,792 A * | 7/1986 | Andrick | ...................... | 277/615 |
| 4,625,383 A | 12/1986 | Vassallo et al. | ............... | 29/445 |
| 4,637,618 A | 1/1987 | Valls | | |
| 4,696,497 A | 9/1987 | Schwarzensteiner | | |
| 5,255,945 A | 10/1993 | Toon | ........................ | 285/305 |
| 6,325,424 B1 | 12/2001 | Metcalfe et al. | ............. | 285/305 |
| 6,352,288 B1 | 3/2002 | Calkins | ....................... | 285/305 |
| 6,913,294 B2 | 7/2005 | Treverton et al. | ........... | 285/406 |
| 6,918,618 B2 | 7/2005 | Allouche | .................... | 285/404 |
| 7,284,310 B2 | 10/2007 | Jones et al. | .................... | 29/447 |
| 2005/0046189 A1 * | 3/2005 | Corbett et al. | .............. | 285/374 |

FOREIGN PATENT DOCUMENTS

| | | |
|---|---|---|
| EP | 1 471 298 | 10/2004 |
| EP | 1471298 A1 * | 10/2004 |
| JP | 2001124265 | 5/2001 |
| WO | WO 01/63163 | 8/2001 |

OTHER PUBLICATIONS

"Certa-Lok" PVC Well Casing, CertainTeed PVC Well Products, copyright 2005.

* cited by examiner

*Primary Examiner*—James M Hewitt
*Assistant Examiner*—Jay R Ripley
(74) *Attorney, Agent, or Firm*—Charles D. Gunter, Jr.

(57) ABSTRACT

A restrained pipe joining system is shown comprising male and female ends each having aligned circumferential grooves which form a canal for passage of a locking key strap. During manufacture, the female belled end is sequentially formed over a Rieber style gasket and then over a ring shaped casing member having an inner circumferential groove formed on its inner circumferential surface. Preferably, the ring shaped casing has circumferentially spaced teeth that act as a pipe stop in cooperation with an outer circumferential groove on the male spigot to index the pipes to be coupled.

4 Claims, 7 Drawing Sheets

RESTRAINED PIPE JOINING SYSTEM FOR PLASTIC PIPE

BACKGROUND OF THE INVENTION

1. Field of the Invention

The present invention relates generally to a restrained joint for coupling plastic pipe and, more specifically, to an improved belling process for the integral manufacture of such a restrained joint in the socket end of a thermoplastic pipe, fitting or coupling.

2. Description of the Prior Art

A variety of piping systems are known for the conveyance of fluids which employ elastomeric type sealing rings or gaskets. The pipes used in such systems may be formed of PVC, polyolefins such as PE and PP, ductile iron, concrete, clay, fiberglass, steel, cast iron, fiberglass/cement reinforced pipes and such metals as aluminum and copper. At the present time, pipes formed of thermoplastic materials, including PVC and polyethylene, are increasingly preferred for use in new pipeline installations for below ground pressure piping such as might be encountered in municipal water systems.

In forming a joint between thermoplastic sections of pipe of this general type, the spigot or male pipe end is inserted within the female or socket pipe end. An annular, elastomeric ring or gasket is typically seated within a groove formed in the socket end of the thermoplastic pipe. As the spigot is inserted within the socket, the gasket provides the seal capacity for the joint. In some instances, it is necessary to provide a "restrained joint" to insure the spigot or male pipe end and the female or socket end do not separate due to hydraulic forces that exist inside the pipeline.

The need to restrain lengths of pipe coupled together in this general fashion exists not only with respect to municipal water lines, but in other diverse applications including well casings, directional drilling applications, laying of fiber optic cable, and above ground pressure piping applications. Over time, various solutions have been proposed for providing the needed restraining function for such applications.

In the area of well casings and directional drilling applications using PVC pipe, one approach has been to use axially aligned circumferential grooves machined into the mouth region of the belled pipe end and into the exterior surface of the mating male, spigot pipe end. A port is drilled through the female bell to complete a circumferentially shaped, canal type passageway for receiving a locking key strap which is subsequently passed through the bell wall, into the canal of the aligned grooves, and around the circumferential passageway.

A number of different variations of this general concept are known in the marketplace at the present time. For example, U.S. Pat. No. 5,662,360 discloses an interlocking restraint plastic pipe joining system which includes pairs of female and male integral end connections. The female end connection has at least one depression within a mouth opening thereof. The male end connection has at least one protrusion formed on an exterior surface thereof which is adapted to matingly engage, in a snap fit fashion, the depression in the mouth opening of the female member.

U.S. Pat. No. 6,086,279 describes the equipment used in a manufacturing process for machining grooves into the inside surface of the female bell member of a plastic pipe coupling. Other patents representative of the general state of the prior art describe various purported improvements to this basic concept, while sharing the common element of machining one or more grooves into the inner mouth region of the belled pipe end.

U.S. Pat. No. 6,352,288 shows a mechanical pipe connection that includes the feature of coupler recesses with discontinuous locking grooves on the pipes. The interlocking system may also include male and female portions which mechanically mesh together to form binding contact between the pipes to reduce the individual rotation of the pipes relative to one another. Similarly, U.S. Pat. No. 5,255,945 discloses a system for connecting sections of plastic tubing which form a sampling pipe for a well, in which a nose of one tube engages a sleeve on the neighboring tube. The system is represented as being an improvement to the tangential-key type of tube jointing system, where a flexible key passes through a keyhole in the sleeve, and around the circumference of the keygroove. This design includes a rectangular key in place of the usual round key. Also shown is an O-ring seal, which resides in a seal-groove cut in the nose, outboard of the key-groove.

U.S. Pat. No. 6,325,424 teaches a coupling assembly for conduit or pipe comprising a first coupling member, a second coupling member and a locking member. The first coupling member is optionally a tubular component and the second coupling member or coupler is optionally a belled component. The invention is also provided with an annular sealing member.

In each of the above described example conduit and pipeline applications, it is desirable that the joint be air and water tight. For example, when pulling fiber optic cable through a conduit, it is a common practice to use air pressure to first blow a fine fish-string through the pipeline. Also, where electrical wire or fiber optic cable is located inside the pipeline, the pipeline joints need to prevent infiltration of ground water. In similar fashion, well casing applications need to prevent infiltration of percolated surface water that potentially contains contaminants. Temporary pressurized and gravity waterlines must also remain water tight for most usable applications.

Due to certain inherent design limitations, most of the currently employed manufacturing techniques for machining grooves into the interior mouth region of the female, belled pipe end or section use a square shaped groove to house an O-ring shaped sealing gasket. It is well understood that, by definition, machining a groove into interior surface of the belled pipe end reduces wall thickness, thereby reducing pipe wall strength. To minimize the depth of the groove, O-rings are most commonly used as the sealing member. U.S. Pat. No. 5,255,945 provides a detailed explanation of these design constraints. U.S. Pat. No. 6,325,424 describes a sealing gasket or element that is generally rectangular in cross-section, residing in a machined groove having a lesser relative depth, which addresses the pipe wall thickness limitation, but with only limited success.

In those joints having circumferential grooves machined into the inside inwardly facing surface of the female bell end and machined into the outside outwardly facing surface of the male spigot end and a port drilled through the female bell, it is necessary to align the port with the groove of the outwardly facing surface of the male spigot during installation by the contractor. Without a positive stop of some type provided by the male and female mating pipe ends, available art often relies on the contractor in the field using visual estimates to make this alignment.

Thus, despite the various advances which have been made in the above described technologies, a need continues to exist for an improved joining system for use in assembling a restrained joint formed between two sections of plastic pipe that can withstand anticipated axial, and/or radial forces, as well as transitory shocks which may be encountered in the environment of use.

A need also exists for such a pipe joining system which is economical to implement so that it does not greatly increase the cost of manufacture of the piping system.

A need exists for such a joining system which the restraint portion of the system works independently of the seal and can thus accept differing seal profiles.

A need exists for such a joining system which is comprised of components which can be mounted on a forming mandrel and which can be belled over in a Reiber style manufacturing operation.

A need exists for a joining system for restrained joint which can meet the needs of such diverse plastic pipe conduit or pipeline applications as above ground temporary water lines, municipal water lines, well casing applications and horizontal drilling applications.

SUMMARY OF THE INVENTION

The present invention is an improved joining system for joining two sections of plastic pipe. The pipe may be straight run piping, or may be a coupling or other connection such as an elbow or tee. In the joining system of the invention, a first section of plastic pipe has a female, belled pipe end with an end opening. The belled pipe end has an exterior surface, an interior surface and a circumferential recess formed in the belled pipe end adjacent the end opening on the interior surface thereof. At least one bore communicates the exterior surface of the belled pipe end with the interior recess thereof.

A second section of plastic pipe has a mating male plastic pipe end having an interior surface and exterior surface. The exterior surface has at least one groove formed at one circumferential location thereof which is alignable with the interior recess formed in the belled pipe end when the male pipe end is inserted within the mouth opening of the belled pipe end to form a joint.

A ring shaped casing member is installed within the circumferential recess provided in the belled end of the first section of plastic pipe, the casing member having an inner circumferential surface and an outer circumferential surface and having at least one groove formed at one inner circumferential location on the inner circumferential surface thereof. At least one bore extends from the outer circumferential surface to the groove which is provided on the inner circumferential surface thereof. The casing member is positionable so that the bore of the casing member aligns with the bore in the belled end of the first section of plastic pipe whereby the bores, in combination with the aligned recess and groove, form a canal passageway for receiving a flexible key strap inserted at least partly therethrough.

The joining system will also typically include a ring shaped sealing element installed within the circumferential recess provided in the first section of plastic pipe adjacent the ring shaped casing member. The preferred sealing element also has an inner circumferential region and an outer circumferential region and is installed within the belled end of the female plastic pipe so that the outer circumferential region forms a seal with the interior surface of the belled end and the inner circumferential region forms a sealing surface for the exterior surface of the mating male pipe section. Preferably, the sealing element is an elastomeric sealing gasket. Most preferably, the sealing element which is used is a Rieber style sealing gasket which has been installed on a belling mandrel and belled over in a plastic pipe bell manufacturing operation. In one application, the sealing element is installed within the circumferential recess of the belled pipe end rearwardly of the ring shaped casing member and of the end opening thereof and has a downwardly extending sealing lip which is contacted by the exterior surface of the mating male plastic pipe during the assembly of the coupling.

In one version of the joining system of the invention, the ring shaped casing member has a leading edge and a trailing edge, the trailing edge being provided with a concave shaped profile which receives a leading nose portion of the sealing element to further secure the sealing element within the circumferential recess provided in the belled pipe end. The leading edge of the casing member has an externally ribbed surface which engages a mating surface on the circumferential recess provided in the belled pipe end. Preferably, the casing member is also installed on a belling mandrel and belled over in a plastic pipe bell manufacturing operation. The casing member can conveniently be formed of a metal, a metal alloy, a composite material, or a plastic or hardened elastomer material.

In another version of the joining system of the invention, the casing member has an outer seal ring located on the outer circumferential surface of the ring shaped casing member and an inner seal ring located on the inner circumferential surface thereof, instead of having a companion seal element. In this case, the outer seal ring forms a seal with the interior surface of the belled end and the inner seal ring forms a sealing surface for the exterior surface of the mating male pipe section.

In a particularly preferred version of the invention, the circumferential recess which is provided in the belled pipe end has a leading wall region, a trailing wall region and a bottom wall. A series of circumferentially spaced teeth are provided on the inner circumferential surface of the casing member which are alignable with a second circumferential groove provided on the exterior surface of the mating male spigot pipe end for receiving and engaging the casing member teeth. The location of the second circumferential groove and the casing member teeth are indexed a calculated distance from the trailing wall region of the circumferential recess. The engagement of the casing member teeth in the second circumferential groove provided on the exterior surface of the mating spigot pipe end assures the correct alignment of the circumferential recess and bore of the belled pipe end, with the bore in the casing member and the first groove in the mating male pipe member for proper receipt of the flexible key strap during assembly of the pipe joint.

In those versions of the invention using both a ring shaped casing member and an adjacent sealing elastomeric gasket, the casing member and gasket are preferably integrated with the female bell end during the manufacturing process in a Rieber process, as described in U.S. Pat. No. 4,120,151 to Parman. The two members are placed on a mandrel of a belling machine and a heated and softened pipe end is pushed up and over each. The pipe end is cooled and the mandrel retracted leaving the ring shaped casing and elastomeric gasket situated inside the female bell end. A hole is drilled though the bell wall and through the casing wall to provide a port for the locking key strap and to communicate with the canal passageway. Using this type of manufacturing process for the joining system of the invention results in improved dimensional precision for the components which make up the canal which is used to receive the locking key strap. Preferably, the casing member which is used in this type manufacturing operation has a series of circumferentially spaced teeth on the inner circumferential surface thereof. The belling mandrel is provided with a series of circumferentially spaced axial grooves in the outer surface thereof at a selected location to accommodate circumferentially spaced teeth of the ring shaped casing member during belling manufacturing operations.

Additional objects, features and advantages will be apparent in the written description which follows.

DETAILED DESCRIPTION OF THE INVENTION

In a first aspect, the present invention uses an integrally formed recess in a female, belled pipe end which recess receives a special ring shaped casing member. The casing member has a groove formed on the inner circumference thereof which is aligned with a circumferential groove which is machined on the outside, outwardly facing surface of the mating male spigot pipe end. A bore is drilled through the female bell end and through the casing member and forms a canal type passageway when the bores and grooves in the casing member and mating spigot pipe end are all aligned. A locking key strap can be inserted through the bore drilled in the female belled pipe end and into the canal of the aligned grooves and be passed around the circumference of the pipe to form a secure joint.

While the following discussion uses the example of two "pipe sections" being joined in a straight run of pipeline or conduit, it will be understood that the principles of the invention can also be used to form a restrained joint in a pipe coupling, fitting, or related application.

Figure 1:
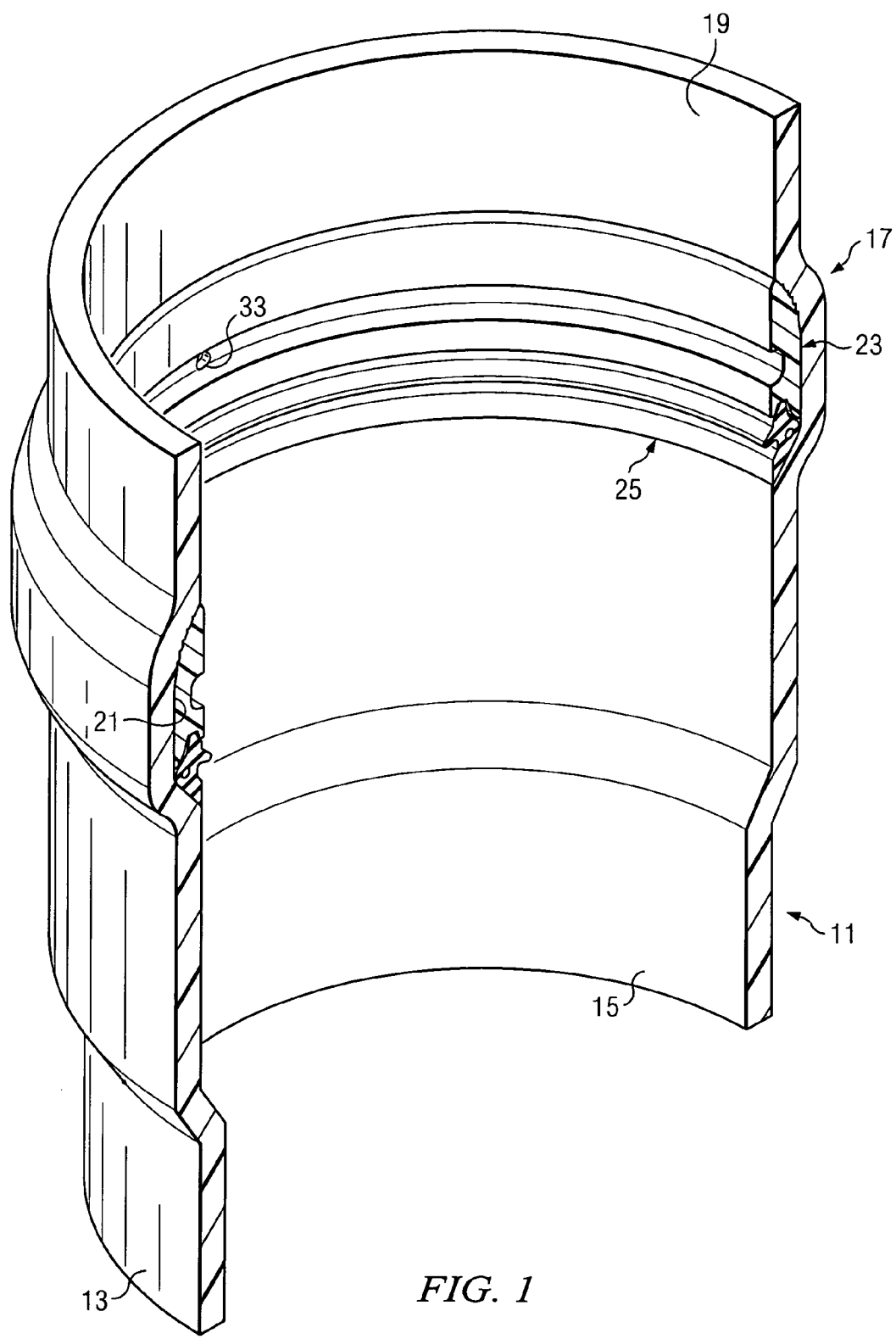
FIG. 1 is a cut away view of one half of a cylindrical female pipe end showing the ring shaped casing and the adjacent elastomeric gasket used in the joining system of the invention.
Figure 2:
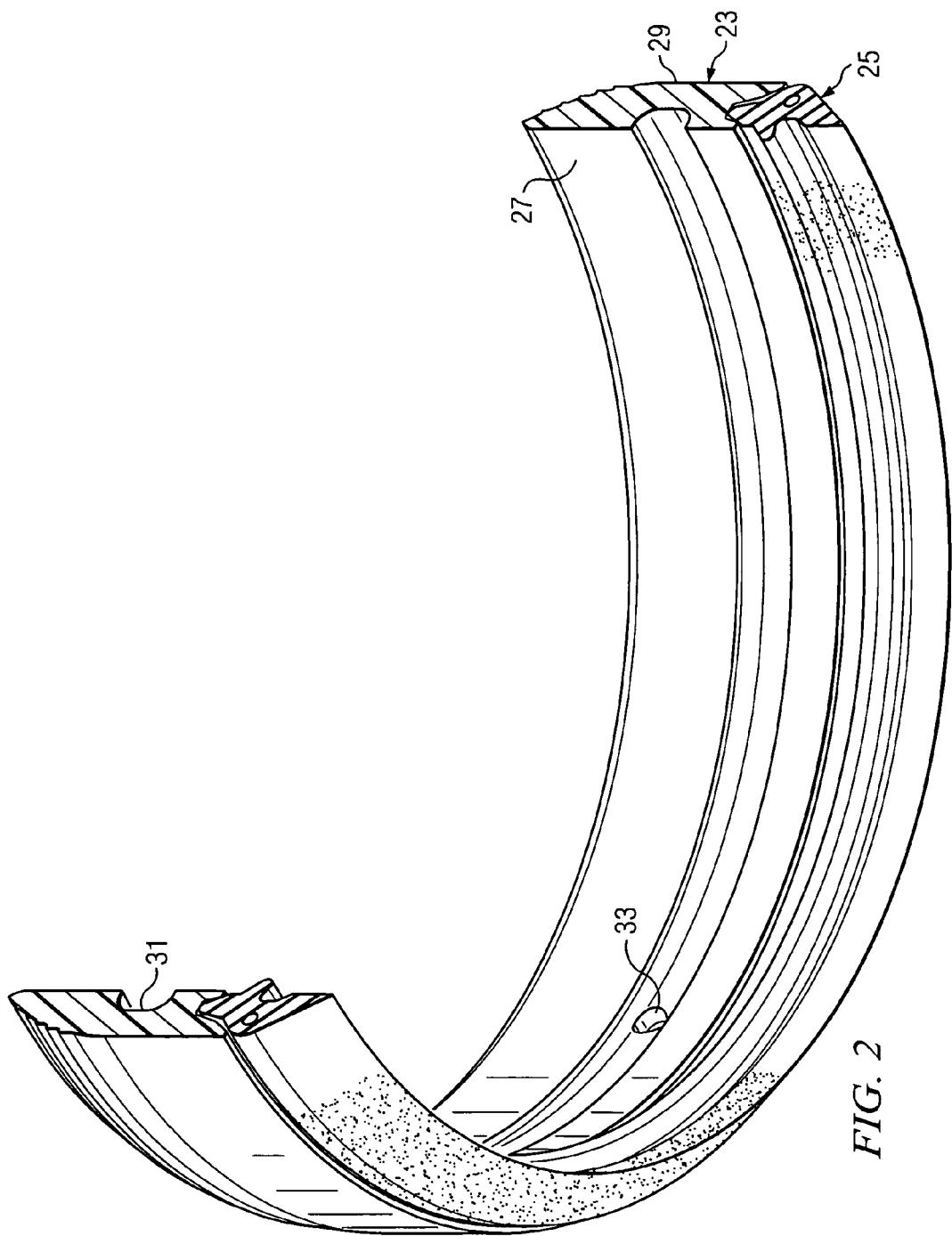
FIG. 2 is an isolated, cut-away view of the ring shaped casing and the adjacent elastomeric gasket of FIG. 1.
Figure 3:
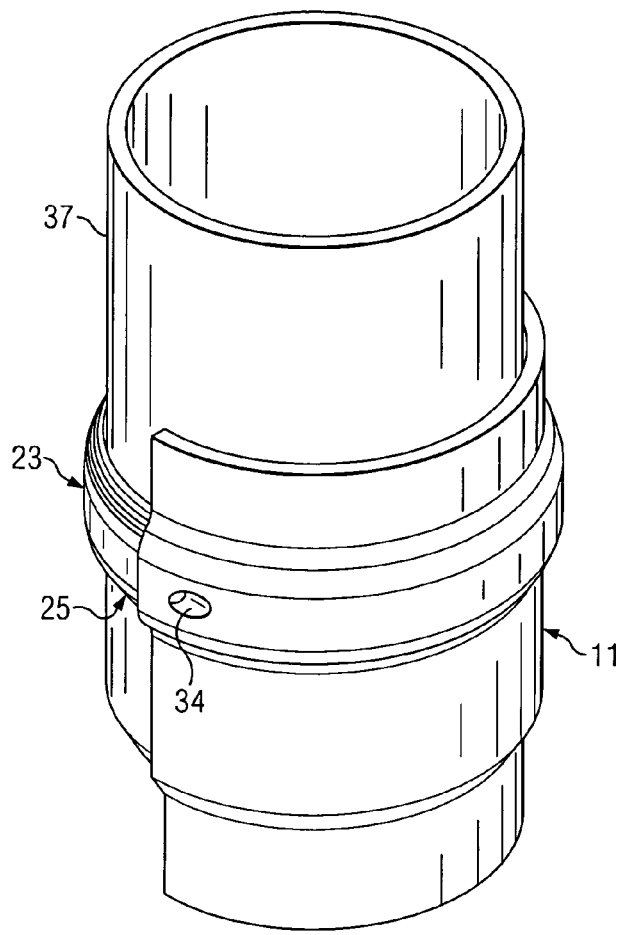
FIG. 3 is a partial perspective view of the female belled pipe end with its ring shaped casing and adjacent elastomeric gasket and illustrating the insertion of the male, spigot pipe end within the female pipe end to form a pipe joint.

FIG. 1 is a quarter sectional view of a first section of plastic pipe 11, typically formed of PVC, having an exterior surface 13, an interior surface 15, and having a female belled pipe end 17. The belled pipe end 17 has a mouth opening 19 has a circumferential recess 21 integrally formed therein adjacent the mouth opening 19. The circumferential recess 21 houses the ring shaped casing member 23 and sealing element 25 of the joining system of the invention. As shown in isolated fashion in FIG. 2, the ring shaped casing member 23 has an inner circumferential surface 27 and an outer circumferential surface 29 and has at least one circumferential groove 31 formed at one inner circumferential location on the inner circumferential surface thereof. At least one bore 33 extends from the outer circumferential surface to the groove 31. As can be seen in FIG. 3, the female, belled pipe end 17 also has a bore 34 drilled therein which communicates the exterior of the belled end with the circumferential recess 21. It will be appreciated that the bore 33 in the casing member 23 can be aligned with the bore 34 in the belled pipe end if the two are properly positioned.

The material used to make the ring shaped casing can be metal or of various plastics, i.e., Nylon, ABS, PVC. The material can be chosen depending upon the desired restraining performance, but will have a modulus and tensile strength equal or greater than that of rigid PVC in the preferred embodiment (7,000 psi and 400,000 psi respectively).

The ring shaped casing member and the adjacent sealing elastomeric gasket member are preferably integrated with the female bell end during the manufacturing process, per the known Rieber belling process which will be familiar to those skilled in the relevant industry. The two members are placed on a mandrel of a belling machine and the heated and softened female pipe end is pushed up and over each of the joining system components. The pipe end is cooled and the mandrel retracted leaving the ring shaped casing and elastomeric gasket situated inside the female bell end. A hole is then drilled though the bell wall and through the casing wall to provide a port for the locking key strap and to communicate with the canal passageway.

Figure 9:
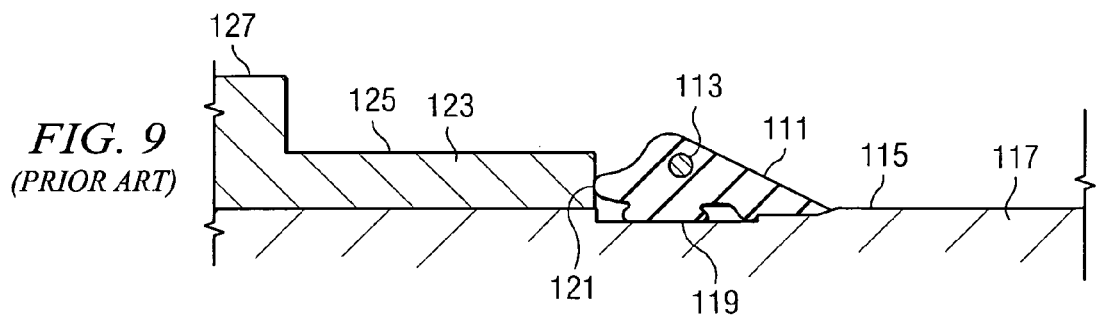
FIG. 9-12 are simplified, schematic views of the prior art Rieber process used to form the belled pipe end used in the joining system of the invention.

In order to further explain the basic steps in a typical Rieber style belling operation, reference will briefly be had to FIGS. 9-12 of the Drawings which provide a simplified illustration of the prior art process. FIG. 9 shows a section of a conventional elastomeric sealing gasket 111 having a steel reinforcing ring 113 in place on the generally cylindrical outer working surface 115 of the mandrel 117 used in the belling process. The elastomeric gasket 111 can be formed of, for example, natural or synthetic rubber or blends thereof including SBR and is a ring shaped, circumferential member having an inner compression surface 119 and an exposed nose portion 121 which, as shown in FIG. 9, abuts a forming collar 123. The forming collar 123 has a first generally cylindrical extent 125 which is joined to a second cylindrical extent 127 by a step region 129, whereby the second extent 127 is of greater external diameter than the first cylindrical extent 125, shown in FIG. 9.

In the first step of the prior art process, the steel reinforced elastomeric ring 111 is thus placed onto the working surface of the mandrel 117 and pushed to a position against the back-up or forming collar 123. In this position, the gasket is firmly anchored to the mandrel surface with the rubber between the mandrel and the steel-ring of the gasket being compressed by approximately 20%.

Figure 10:
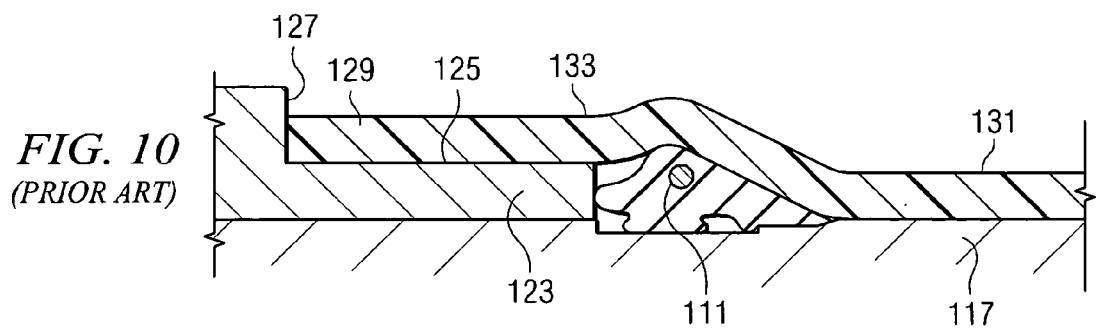
Figure 11:
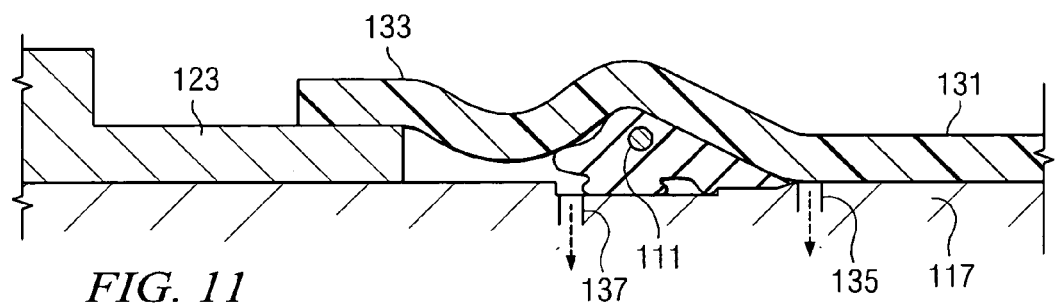

In the second step of the prior art process shown in FIG. 10, the socket end 133 of the thermoplastic pipe 131 is heated and pushed over the steel mandrel 117, gasket 111 and back-up collar 123. The socket end 133 is expanded due to the thermoplastic nature of the pipe. A number of thermoplastic materials, such as polyethylene, polypropylene and polyvinylchloride (PVC) are known in the prior art having the required expansion characteristics, depending upon the end application of the pipe joint. The socket end 133 flows over the first cylindrical extent 125 of the back-up collar 123 and abuts the step region 129 in the second step of the process.

In the next step of the prior art process (FIG. 11) the mandrel and pipe move away from the back-up collar 123 and the pipe socket end 133 retracts around the mandrel and gasket 111 due to the elastic forces of the thermoplastic material. Typically, vacuum was also applied through ports 137 which connected the mandrel working surface with a vacuum source (not shown).

Figure 12:
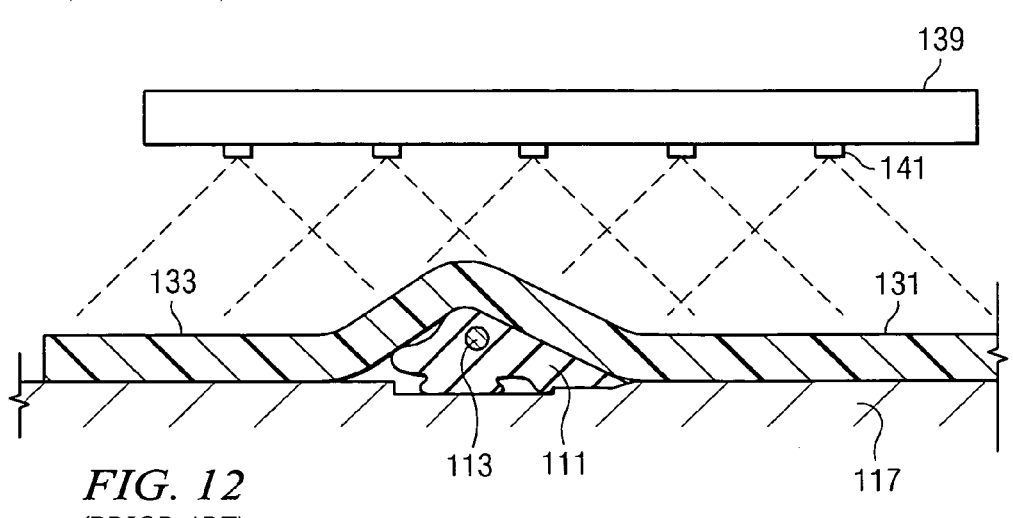

In the final step of the prior art process shown in FIG. 12, the pipe socket end 133 is cooled by means of a water spray bar 139 and spray nozzles 141. As the cooling takes place, the pipe socket end 133 shrinks around the gasket 111, thus compressing the rubber body of the gasket between the steel reinforcing ring 113 and the socket-groove to establish a firm seal.

Figure 14:
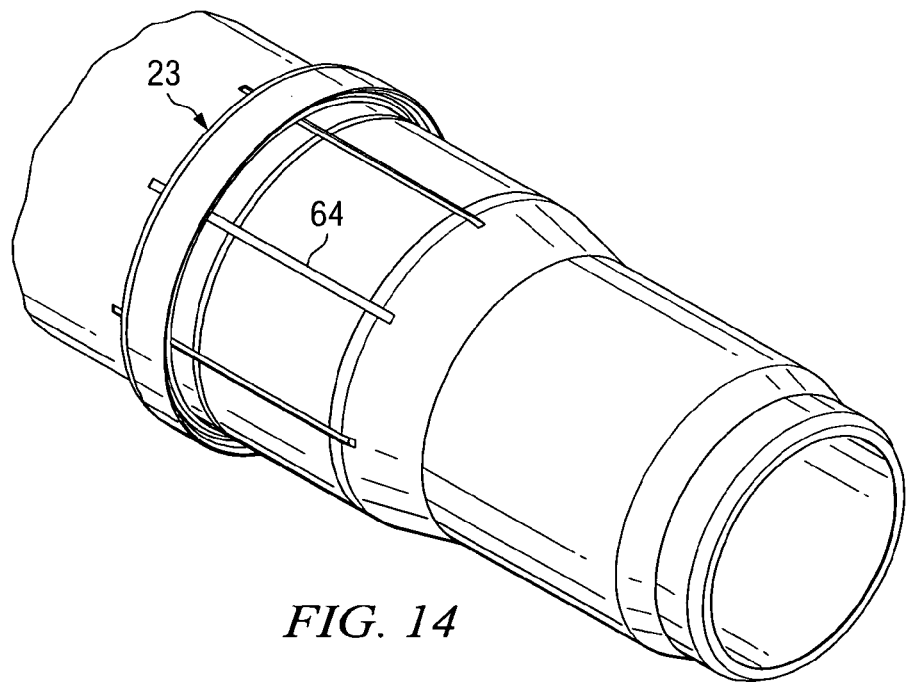
FIG. 14 is a partial perspective view of the modified belling mandrel which is provided with axial grooves to accept the teeth on the casing member during loading.

The manufacturing process used in forming the joining system of the present invention uses these same general steps, except that the special ring shaped casing member 23 is also installed on the forming mandrel (see FIG. 14) at a second circumferential location ahead of (to the right of as viewed in FIG. 9) the sealing gasket. Then, using the same general method steps as have been described, both the sealing gasket and casing member are belled over during the belling operation. Also, in some situations, only the ring shaped casing member is installed on the mandrel and belled over, as will be explained in greater detail below.

Figure 4:
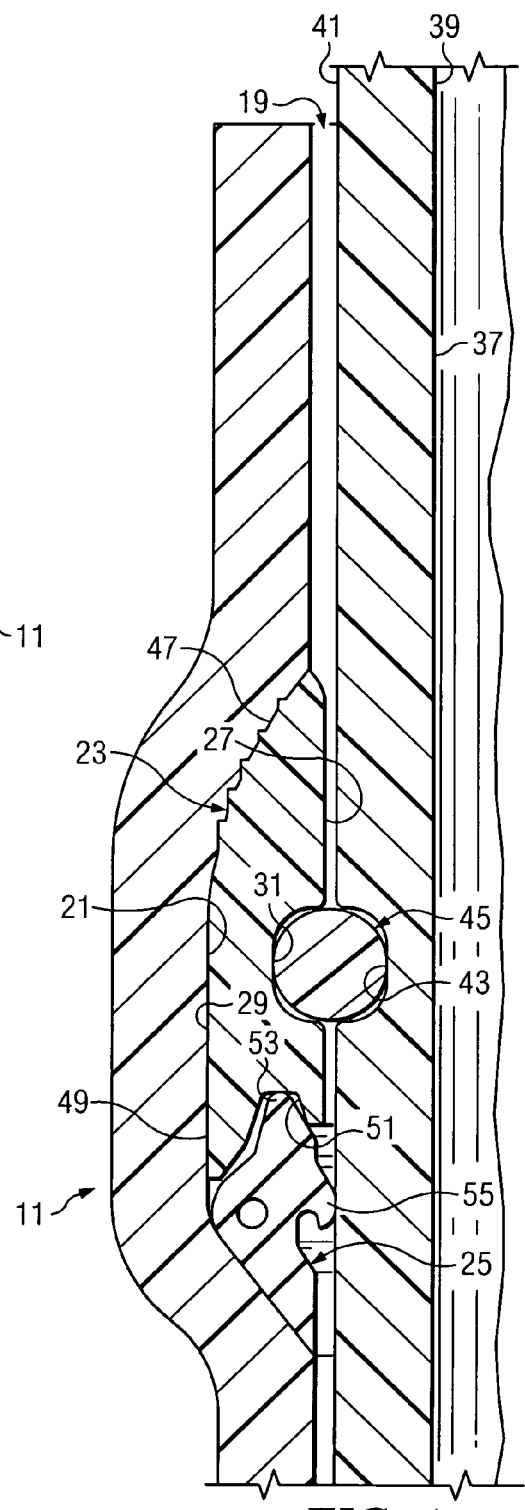
FIG. 4 is a side, quarter cross sectional view of the joining system of the invention showing the ring shaped casing member and the companion elastomeric gasket as the male pipe end is being installed within the female, belled pipe end.

FIG. 4 is a quarter sectional view of the belled pipe end 11 showing the internal components of the joining system of the invention and also showing the insertion of the mating male plastic pipe end 37. The mating second section of plastic pipe 37 has an interior surface 39 and an exterior surface 41. The exterior surface 41 has at least one groove 43 formed at one circumferential location thereof which is alignable with the interior recess 21 formed in the belled pipe end 11 when the male pipe end 37 is inserted within the mouth opening 19 of the belled pipe end to form a joint. As will be appreciated from FIG. 4 and the discussion which follows, the casing member 23 is positionable so that the bore of the casing member 33 aligns with the bore 34 in the belled end of the first section of plastic pipe, whereby the bores, in combination with the aligned recess 21 and groove 43, form a canal type passageway for receiving a flexible keystrap 45 inserted at least partly therethrough.

As also will be appreciated from FIG. 4, the ring shaped casing member 23 has a leading edge 47 and a trailing edge 49. The trailing edge 49 is preferably provided with a concave shaped profile 51 which receives a leading nose portion 53 of the sealing element 25 to further secure the sealing element within the circumferential recess 21 provided in the belled pipe end. The leading edge 47 of the casing member 23 is also preferably provided with a ribbed profile which engages a mating surface provided within the recess 21.

While the sealing element can assume a number of forms, it will typically installed within the circumferential recess 21 of the belled pipe end rearwardly of the ring shaped casing member 23 and of the mouth opening 19 thereof. In the particular embodiment illustrated in FIG. 4, the elastomeric sealing gasket 25 has a downwardly extending sealing lip 55 which is contacted by the exterior surface 41 of the mating male plastic pipe 37 during the assembly of the joint. Thus, with the sealing element illustrated in FIG. 4, the outer circumferential region of the gasket forms a seal with the interior surface of the belled pipe end and the inner circumferential region forms a sealing surface for the exterior surface of the mating male pipe section.

Figure 6:
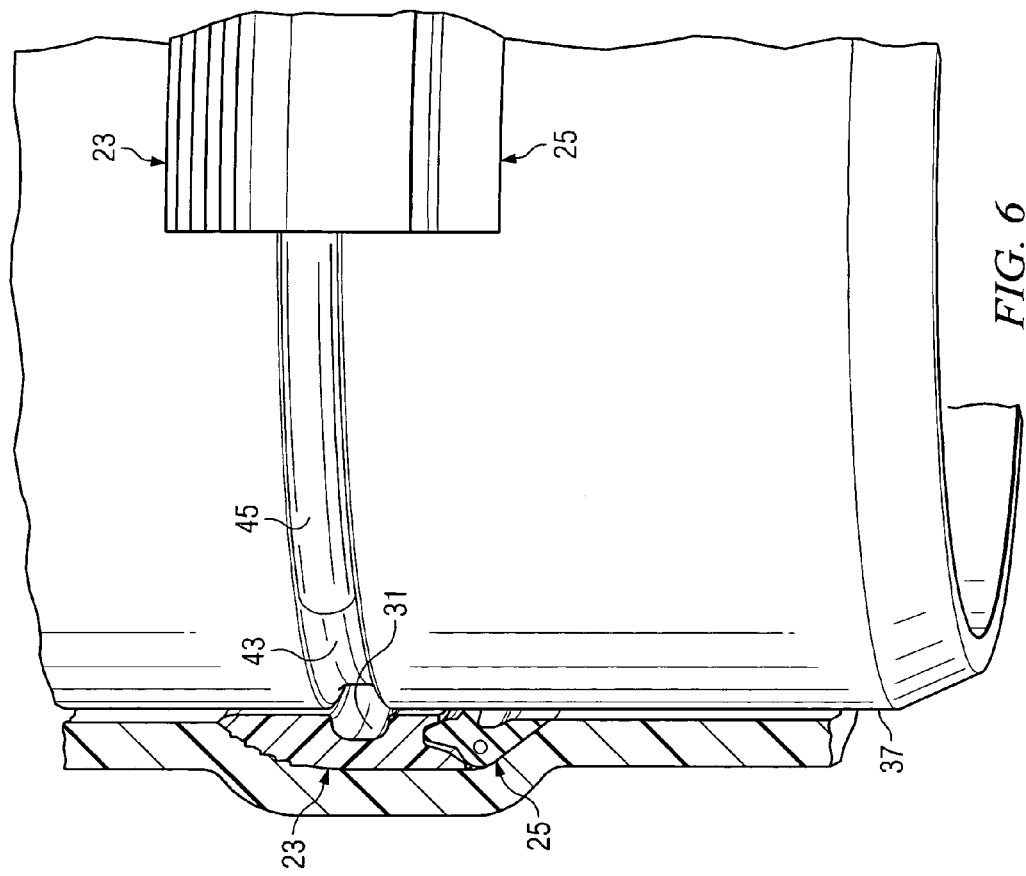
FIG. 6 is an enlarged view showing a cut away of the female belled pipe end and showing the locking key strap passing through the canal passageway to securely join the female pipe section to the male pipe section.
Figure 5:
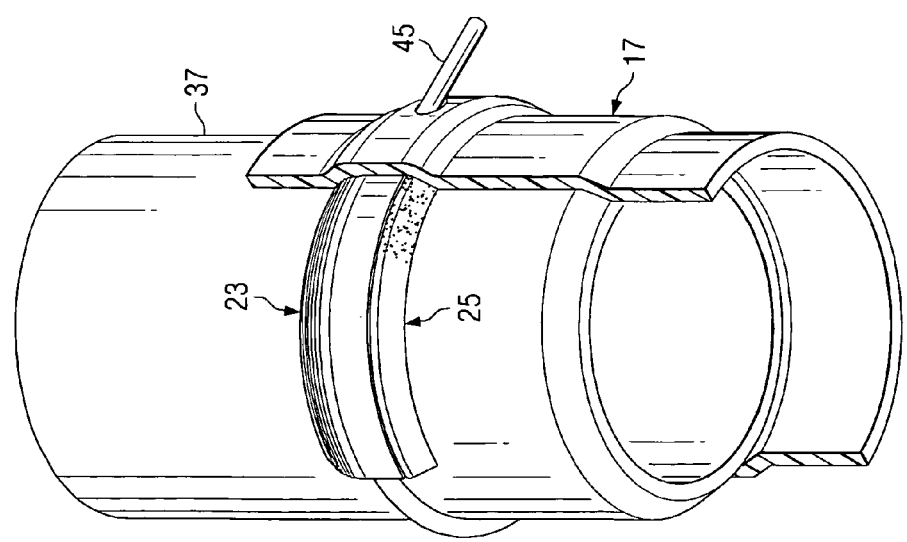
FIG. 5 is another partial perspective view, similar to FIG. 3, but showing the insertion of the locking keystrap into the aligned bores and grooves which make up the canal passageway of the inventive system.

FIGS. 5 and 6 are partially cut away views of the male spigot pipe end 37 being installed within the belled female pipe end 17. The locking keystrap 45 is inserted through the bore (34 in FIG. 3) of the belled pipe end and passes around the machine to groove 43 on the mating male pipe 37 and within the groove 31 provided on the inner circumferential surface of the casing member 23.

Figure 8:
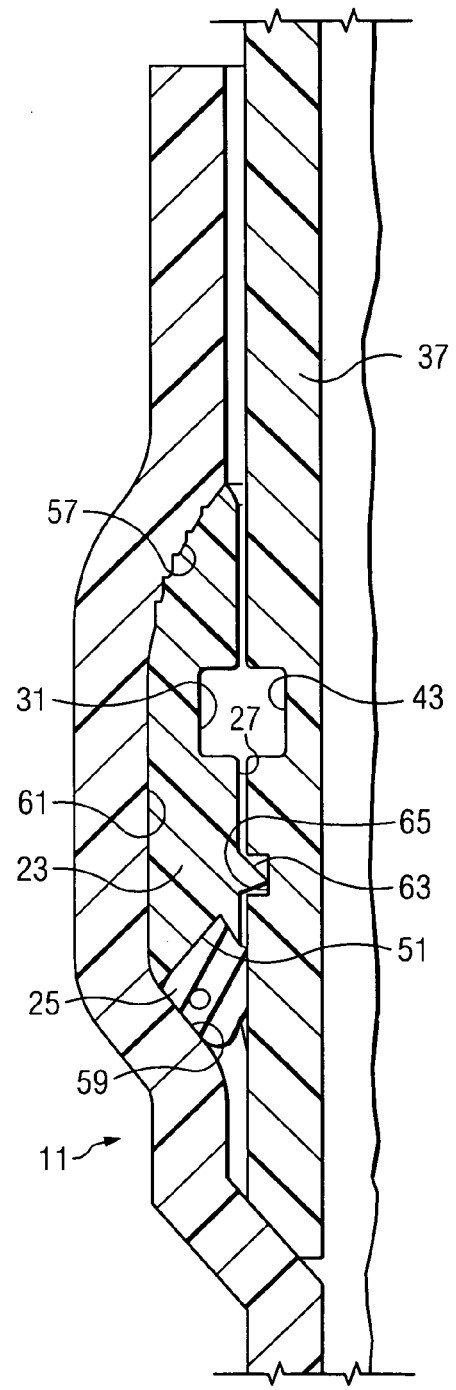
FIG. 8 illustrates a further embodiment of the present invention in which the ring shaped casing is provided with a series of circumferentially spaced teeth, the mating male spigot pipe end also being provided with a series of indentations to receive the teeth in order to properly index the relative position of the components of the joining system.

In the preferred joining system of the invention, the respective component parts are indexed in order to properly insure the alignment of the respective grooves and bores thereof. Thus, with respect to FIG. 8, it will be evident that the circumferential recess 21 provided in the belled pipe end has a leading wall region 57, a trailing wall region 59 and a bottom wall region 61. A series of circumferentially spaced teeth 63 are provided on the inner circumferential surface 27 of the casing member 23 and are alignable with a second circumferential groove 65 which has been machined on the exterior surface of the mating male spigot pipe end 37 for receiving and engaging the casing member teeth 63. The second circumferential groove 65 and location of the casing teeth are both indexed a selected distance from the trailing wall region 59 of the circumferential recess 21 provided in the belled pipe end. The engagement of the casing member teeth 63 in the second circumferential groove 65 provided on the exterior surface of the mating male pipe end 37 assures the correct alignment of the circumferential recess and the bore of the belled pipe end and the bore 33 in the casing member with the first groove and the mating male pipe member 37 for proper receipt of the flexible keystrap 45.

Figure 13:
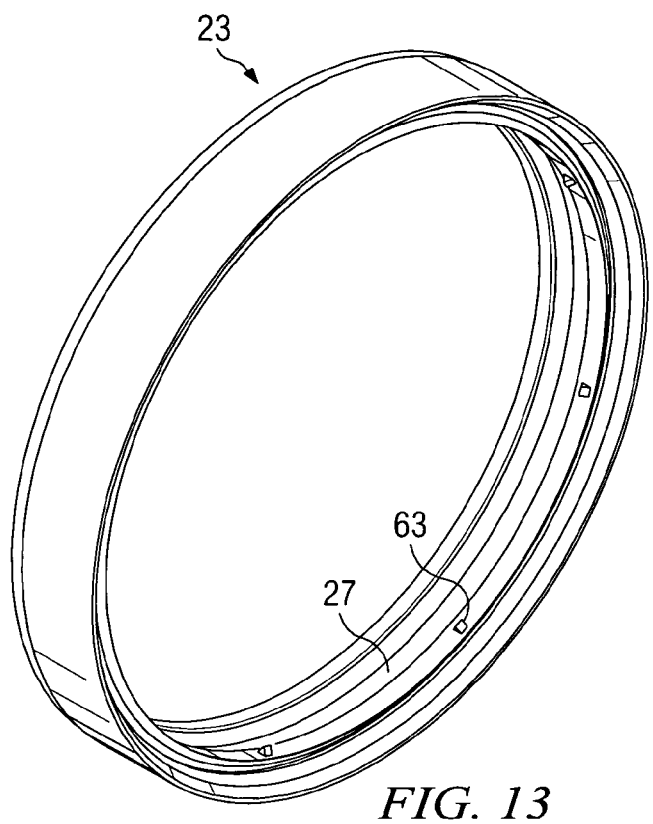
FIG. 13 is a perspective view of the casing member of FIG. 8 showing the circumferentially spaced teeth on the inner circumference thereof.

The provision of the indexing teeth 63 (see FIG. 13) on the inner circumferential surface 27 of the casing member 23 will typically require some sort of modification of the original belling mandrel used in the Rieber style belling process. However, if the casing member is provided with equally spaced individual teeth, as opposed to single tooth going around the entire inner circumferential surface, the belling mandrel could have slots (64 in FIG. 14) milled in the axial direction so that the teeth would slide through them when the casing was "loaded." Other designs, such as collapsible mandrels, and the like, which will be familiar to those skilled in the art, could also be envisioned.

Figure 7:
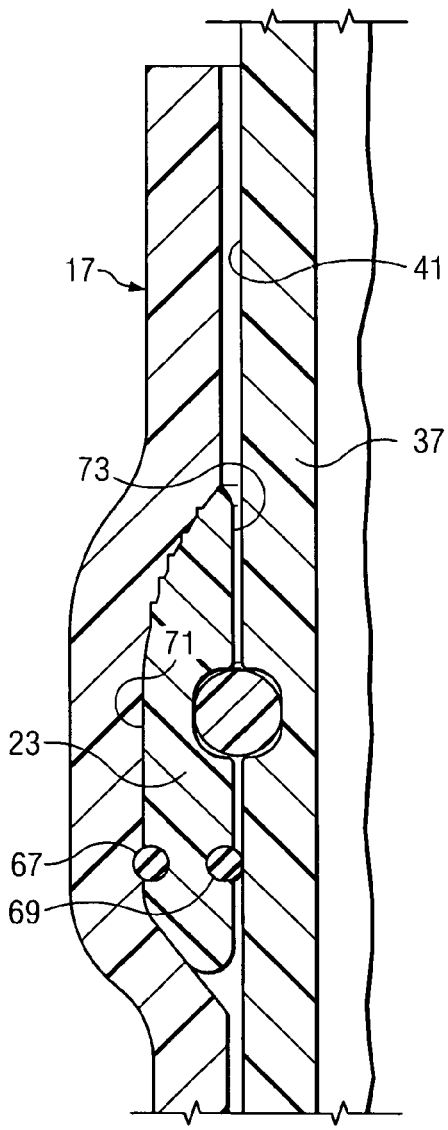
FIG. 7 is an alternate design of the joining system of the invention in which there are O-ring seals located on opposing surfaces of the ring shaped casing member, rather than using a separate sealing gasket.

While the invention has been described with the respect to the preferred Rieber style sealing gasket, which is integrally belled during the female pipe manufacturing operation, FIG. 7 illustrates another version of the casing member 67 of the invention. In the version of the invention illustrated in FIG. 7, an outer O-ring seal 67 is provided in a groove located on the outer circumferential surface 71 of the casing member 67 while an inner O-ring seal 69 is similarly located in groove provided on the inner circumferential surface 73 thereof. In this way, the outer O-ring seal 67 forms a seal with the interior surface of the belled pipe end 17 and the inner O-seal ring 69 forms a sealing surface for the exterior surface 41 of the mating male pipe section 37.

The invention has been provided with several advantages. Because the joining system of the invention eliminates the need for machining of the female bell wall, it overcomes several significant short-comings of currently available art. As set out in the Background discussion, machining of the female bell wall to provide a recess or groove for the locking key strap passage way and the elastomeric sealing element weakens the ultimately formed joint substantially. Further, machining these grooves in the most commonly used plastic material, PVC, creates notches in a notch-sensitive polymer. Eliminating the machined grooves eliminates notches from which brittle failure of the joint occurs in practice.

Eliminating machining of the groove used to house the prior art O-ring elastomeric seal by using a Rieber-style gasket eliminates current design constraints associated with O-rings. As a result, manufacturing tolerances are not required to be as exacting, lip seal gasket designs are made possible and higher pressure rated joints are made possible. The addition of the ring shaped casing also reinforces the female belled pipe end.

Reinforcement of the female bell end improves handling durability and provides for higher pressure rated joining systems. The addition of the ring shaped casing also reinforces the female bell end for axial deflection forces commonly encountered in directional drilling applications.

Machining grooves in the outside outwardly facing surface of the male spigot end does not present the problems associated with machining grooves in the inside inwardly facing surface of the female bell end. The assembled male spigot is not subject to the same set of stresses, stains, and transitory shocks as the assembled female bell.

While the invention has been shown in only one of its forms, it is not thus limited but is susceptible to various changes and modifications without departing from the spirit thereof.

What is claimed is:

1. A joining system for use in assembling a restrained joint of a first and second sections of plastic pipe, the joining system comprising:

a first section of plastic pipe having a female, belled pipe end with an end opening, an exterior surface, an interior surface, and having a heat and expansion formed interior circumferential recess formed in the belled pipe end adjacent the end opening on the interior surface thereof;

at least one bore communicating the exterior surface of the belled pipe end with the interior circumferential recess thereof;

a second section of plastic pipe having a mating male plastic pipe end having an interior surface and exterior surface, and wherein the exterior surface has at least one groove formed at one circumferential location thereof which is alignable with the interior circumferential recess formed in the belled pipe end when the male pipe end is inserted within the mouth opening of the belled pipe end to form a joint;

a ring shaped casing member installed within the heat and expansion formed interior circumferential recess provided in the belled end of the first section of plastic pipe, the casing member having an inner circumferential surface and an outer circumferential surface and having at least one groove formed at one inner circumferential location of the inner circumferential surface thereof, wherein at least one bore extends from the outer circumferential surface to the groove which is provided on the inner circumferential surface thereof, and wherein the casing member is positionable so that the bore of the casing member aligns with the bore in the belled end of the first section of plastic pipe, whereby the bores, the at least one groove of the casing member, and the at least one groove of the second section of the plastic pipe form a canal passageway for receiving a flexible key strap to be inserted at least partly therethrough when the first and second plastic pipes are joined;

a ring shaped elastomeric sealing element installed within the same heat and expansion formed interior, circumferential recess provided in the first section of plastic pipe as the ring shaped casing member and in contact with the ring shaped casing member, the sealing element having an inner circumferential region and an outer circumferential region, the sealing the outer circumferential region forming a seal with the interior surface of the belled end of the first pipe and the inner circumferential region forming a seal with the exterior surface of the mating male pipe section when the male pipe end is inserted within the opening of the belled pipe end, the sealing element being installed within the circumferential recess of the belled pipe end rearwardly of the ring shaped casing member and of the end opening of the bell pipe end; and wherein the ring shaped casing member has a leading edge and a trailing edge, the trailing edge being provided with a recessed profile which mates with and engages a leading nose portion of the sealing element so that while the sealing element and the ring shaped casing member are separate elements, the sealing element and the casing member are interengaged with the leading nose portion of the sealing element extending into the concave recessed profile of the ring shaped casing member, the interengagement to secure the sealing element within the interior of the circumferential recess.

2. The joining system of claim 1, the sealing element having a downwardly extending sealing lip which is contacted by the exterior surface of the mating male plastic pipe to form a lip seal during the assembly of the coupling.

3. The joining system of claim 2, wherein the leading edge of the casing member has an externally ribbed surface which engages a mating surface on the circumferential recess provided in the belled pipe end.

4. The joining system of claim 3, wherein the casing member is formed of a material selected from the group consisting of metals, metal alloys, plastics and composites.

* * * * *